(12) United States Patent
Cairns et al.

(10) Patent No.: US 7,688,881 B2
(45) Date of Patent: Mar. 30, 2010

(54) METHOD AND APPARATUS FOR INTERFERENCE ESTIMATION IN A GENERALIZED RAKE RECEIVER

(75) Inventors: Douglas A. Cairns, Durham, NC (US); Gregory E. Bottomley, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 876 days.

(21) Appl. No.: 11/479,483

(22) Filed: Jun. 30, 2006

(65) Prior Publication Data

US 2008/0002759 A1 Jan. 3, 2008

(51) Int. Cl.
*H04B 1/707* (2006.01)
(52) U.S. Cl. .................... 375/148; 375/150
(58) Field of Classification Search ............ 375/142, 375/144, 148, 150, 350; 370/320, 335, 342, 370/441
See application file for complete search history.

(56) References Cited

U.S. PATENT DOCUMENTS

| | | | | |
|---|---|---|---|---|
| 6,028,887 | A * | 2/2000 | Harrison et al. | 375/147 |
| 6,577,674 | B1 * | 6/2003 | Ko et al. | 375/148 |
| 6,842,479 | B2 * | 1/2005 | Bottomley | 375/150 |
| 2005/0078639 | A1 * | 4/2005 | Oura | 370/335 |
| 2005/0215218 | A1 | 9/2005 | Bottomley et al. | |
| 2005/0265496 | A1 | 12/2005 | Johansson et al. | |
| 2006/0007990 | A1 | 1/2006 | Cozzo et al. | |

FOREIGN PATENT DOCUMENTS

WO  WO 2004/021580  3/2004

OTHER PUBLICATIONS

Kutz, Gideon and Chass, Amir, "Low Complexity Implementation of a Downlink CDMA Generalized RAKE Receiver." In Proc. IEEE Vehicular Technology Conference, Sep. 25-28, 2002, 5 pages, Vancouver, Canada.
Khayrallah, Ali S. and Cairns, Douglas A., "Fast Finger Selection for GRAKE." IEEE 61$^{st}$ Vehicular Technology Conference VTC 2005-Spring, May 30 to Jun. 1, 2005, pp. 728-132, vol. 2.

(Continued)

*Primary Examiner*—Don N Vo
(74) *Attorney, Agent, or Firm*—Coats & Bennett, PLLC (57) ABSTRACT

According to one embodiment taught herein, a method of determining impairment correlations between a plurality of delays of interest for a received CDMA signal comprises generating kernel functions as samples of a net channel response of the received CDMA signal taken at defined chip sampling phases for delay differences between the plurality of delays of interest. In a parametric Generalized Rake (G-Rake) receiver embodiment, the delays of interest represent the delay positions of the fingers being used to characterized received signal. In a chip equalizer receiver embodiment, the delays of interest represent the delay positions of the equalizer taps. The method continues with determining impairment correlations based on convolving the kernel functions. Corresponding receiver circuits, including an impairment correlation estimation circuit configured for parametric G-Rake operation, may be implemented in a variety of communication devices and systems, such as in wireless communication network base stations and mobile stations.

31 Claims, 8 Drawing Sheets

OTHER PUBLICATIONS

Chaparro et al., "Channel Modeling for Spread Spectrum Via Evolutionary Transform," May 17, 2004, pp. 609-612, XP10717974.
Cairns et al., "Low Complexity Parameter Estimation for the Generalized Rake Receiver," Digital Signal Processing Workshop, Aug. 1, 2004, pp. 191-195, XP10806726.

Co-pending U.S. Appl. No. 11/751,109, filed May 21, 2007.
Co-pending U.S. Appl. No. 11/762,982, filed Jun. 14, 2007.
Co-pending U.S. Appl. No. 11/935,840, filed Nov. 7, 2007.

* cited by examiner

METHOD AND APPARATUS FOR INTERFERENCE ESTIMATION IN A GENERALIZED RAKE RECEIVER

TECHNICAL FIELD

The present invention generally relates to communication systems and signals, and particularly relates to interference estimation, such as done in parametric Generalized RAKE (G-Rake) receivers.

BACKGROUND

Interference cancellation stands as an important component of contemporary and developing communication systems. For example, interference cancellation performance affects transmission power requirements and link utilization efficiencies in both the uplinks and downlinks of wireless communication systems, such as cellular communication networks based on the Wideband Code Division Multiple Access (WCDMA) or IS-2000 standards. Put simply, better interference cancellation enables data transmission at lower power levels and/or at higher data rates than would otherwise be possible.

As might be expected, the particulars of interference cancellation vary as a function of many variables, such as the communication signal types and protocols involved, details of the transmitting and receiving equipment, etc. However, providing good interference cancellation performance not infrequently requires significant signal processing resources, owing to the need for characterizing and suppressing received signal interference in real time.

For example, G-Rake receivers use extra despreading fingers to improve demodulation. To determine the finger delays, a probing approach may be used, in which weights are computed for a candidate set of delays and then re-computed for a selected set of finger delays. In general, candidate delays and finger delays are referred to as processing delays. Similarly, chip equalizers use processing delays corresponding to equalizer tap locations.

Impairment cross-correlations can be represented as an impairment covariance matrix $R_u$, and that matrix in turn can be used to generate the combining weights used by the G-Rake receiver in combining despread data values. By computing the combining weight vector, w, as, $$w = R_u^{-1} h \quad \text{Eq. (1)}$$

the G-Rake receiver uses the impairment covariance matrix to whiten colored interference in the received signal(s) of interest, where h is the net channel response vector.

There are several approaches for generating $R_u$ in the G-Rake context, depending on the involved variant of G-Rake receiver. For example, "parametric" G-Rake receivers consider the impairments covariance matrix as a sum or combination of different interference contributions, including contributions from own-cell interference, white noise, and other-cell interference. With this parametric model, and assuming the reception of signals from J+1 network base stations, the impairment covariance matrix is given by $$R_u = E_c R_I + N_0 R_n + \sum_{j=1}^{J} E_c^j R_O^j = N_0 R_n + \sum_{j=0}^{J} E_c^j R_O^j - hh^H \quad \text{Eq. (2)}$$

where $E_c$=average energy transmitted per chip of own-cell base station, $N_0$=one-sided power spectral density of white noise, $E_c^j$=average energy transmitted per chip of jth other-cell base station, $R_I$=own-cell interference covariance matrix, $R_n$=white noise passed through pulse shaping filter covariance matrix, and $R_O^j$=jth other-cell interference covariance matrix. (Note that the second formulation of Eq. (2) emphasizes that the own-cell interference term can be computed in a fashion similar to that used for other-cell interference, provided that a benign signal term is subtracted—e.g., $R_I = R_O^0 - hh^H$. Assuming that other-cell interference is not modeled as white noise, the computation of $R_I$ contributes significantly to the overall complexity of a parametric G-Rake receiver operation.

One mechanism for calculating entries for $R_I$ is given by, $$R_I(d_1, d_2) = \sum_{l=0}^{L-1} \sum_{q=0}^{L-1} g_l g_q^* \sum_{\substack{m=-\infty \\ m \neq 0}}^{m=\infty} R_p(d_1 - mT_c - \tau_l) R_p^*(d_2 - mT_c - \tau_q) \quad \text{Eq. (3)}$$

where $g_l$ represents the lth medium coefficient, $d_k$ is the kth finger delay, $\tau_j$ is the jth channel delay, $T_c$ is a CDMA chip period, and $R_p(*)$ is the autocorrelation of the receive pulse shaping filter. (Note that if the transmit and receive pulse filters are not the same, then $R_p(*)$ includes convolution of the transmit and receive pulse filters.)

By manipulation, Eq. (3) is shown to be equivalent to $$R_I(d_1, d_2) = \sum_{l=0}^{L-1} \sum_{q=0}^{L-1} g_l g_q^* [R_{pp}(\Delta_1 - \Delta_2) - R_p(\Delta_1) R_p^*(\Delta_2)] \quad \text{Eq. (4)}$$

where $$\Delta_1 = d_1 - \tau_l \text{ and } \Delta_2 = d_2 - \tau_q,$$

and $$R_{pp}(\Delta_1 - \Delta_2) = \sum_{m=-\infty}^{\infty} R_p(\Delta_1 - mT_c) R_p^*(\Delta_2 - mT_c).$$

$R_{pp}(*)$ can be pre-computed, thereby saving run-time computations, such that the signal processing implementation of Eq. (4) reduces to a few table lookups and a multiplication. However, the table lookup for $R_{pp}(*)$ is somewhat complicated because it depends not only on the difference between $\Delta_1$ and $\Delta_2$, but also at what sample phase the difference occurs. Also, because $R_{pp}(*)$ is not symmetric, one must also account for positive and negative delay differences in selecting lookup table entries.

Because of the above complications, the required table lookup operations depend on a greater number of variables, meaning more processing decisions have to be made to identify proper table entries, which in turn requires greater processing power or speed and a greater amount of working memory. Such complications detract from the efficiency gains otherwise afforded by the implementation of Eq. (4) for $R_I$ computation in a parametric G-Rake receiver.

Another approach expresses $R_I$ as, $$R_I(d_1, d_2) = \sum_{l=0}^{L-1}\sum_{q=0}^{L-1} g_l g_q^* [R(n_1, n_2) - \frac{1}{N^2}\sum_{m=1-N}^{N-1}(N-|m|) \quad \text{Eq. (5)}$$

$$R_p(d_1 - mT_c - \tau_l)R_p^*(d_2 - mT_c - \tau_q)]$$

From inspection, Eq. (5) has similarities to the formulation given in Eq. (4) but with $R(n_1,n_2)$ equivalent to (and replacing) $R_{pp}(*)$, and a more complicated expression involving the sum of products of $R_p(*)$. Under limited reception conditions—i.e., minimal time dispersion in the propagation channel—the lookup tables for $R(n_1,n_2)$ and $R_p(*)$ need only span a few CDMA spreading chips to yield acceptable performance. However, Eq. (5) does not necessarily yield good performance over a range of channel conditions, and still entails significant computational complexity.

SUMMARY

According to one embodiment taught herein, a method of determining impairment correlations between a plurality of delays of interest for a received CDMA signal comprises generating kernel functions as samples of a net channel response of the received CDMA signal taken at defined chip sampling phases for delay differences between the plurality of delays of interest. In a parametric Generalized Rake (G-Rake) receiver embodiment, the delays of interest represent the delay positions of the probing fingers being used to characterize received signal interference. The method continues with determining impairment correlations based on convolving the kernel functions.

Use of the kernel functions to obtain the elements of same-cell and/or other-cell impairment correlation matrices, which may be expressed as covariance matrices offers a number of computation and implementation advantages. For example, in one embodiment where the net channel response is oversampled by a factor of M, each kernel function corresponds to net channel response samples taken at a particular offset and a particular sample phase over a defined time window, which may encompass a maximum probing finger delay spread. Thus, an impairment correlation estimation circuit may be configured to obtain correlation estimates by convolving each such kernel function with itself and with each of the other kernel functions.

Processing efficiencies are gained by performing such convolutions in the frequency domain via Fast Fourier Transform (FFT) processing. Thus, one embodiment of an impairment correlation estimation circuit includes FFT circuits configured to perform M FFTs, compute all product combinations of the M FFTs, and then perform $M^2$ IFFTs to obtain time-domain impairment correlation results. As those results comprise impairment correlation estimates for all delay combinations over the defined time window, determining impairment correlation matrix entries comprises picking the delay combinations—i.e., finger delay differences—of interest. Such processing may be performed for the determination of both same-cell and other-cell impairment correlations, although same-cell determinations generally require the subtraction of a benign interference term.

In another embodiment, the impairment correlation estimation circuit may be realized in a more compact form through manipulation of the kernel functions to form interleaved functions, which may be zero padded. The interleaved functions collect the individual kernel functions in shifted and non-shifted forms, and thus allow the impairment correlation estimation circuit to perform a single FFT of size $NM^2$, where N equals the length of the kernel function and M equals the number of sample phases. With this approach, time domain results—i.e., the impairment correlation estimates for all delay combinations over the time window spanned by the FFT—may be obtained by performing one IFFT of size $NM^2$. Of course, other kernel function manipulations may be used as needed or desired.

In general, the methods and apparatus taught herein for impairment correlation estimation may be used in essentially any type of wireless communication device or system involving CDMA signals. By way of non-limiting example, a parametric G-Rake circuit is configured to estimate received signal impairment correlations using the kernel function processing described herein. The parametric G-Rake circuit may be applied advantageously to uplink signal processing, such as at a wireless communication network base station, and/or to downlink signal processing, such as at a wireless communication terminal or handset. As another non-limiting example, a chip equalizer is configured to estimate received signal impairment correlations using the kernel function processing described herein.

Of course, the present invention is not limited to the above features and advantages. Indeed, those skilled in the art will recognize additional features and advantages upon reading the following detailed description, and upon viewing the accompanying drawings.

DETAILED DESCRIPTION OF EMBODIMENTS

Figure 1:
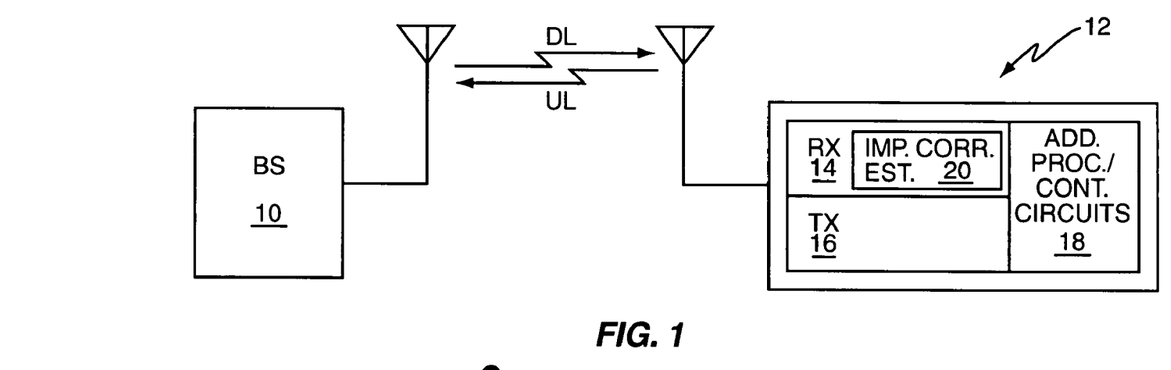
FIG. 1 is a block diagram of one embodiment of a wireless communication network base station, and one embodiment of a wireless communication device.

FIG. 1 offers simplified depictions of a base station 10 transmitting signals on a downlink (DL) to wireless communication device 12, which transmits signals on an uplink (UL) to the base station 10. The wireless communication device 12 includes a receiver circuit 14, a transmitter circuit 16, and one or more additional processing circuits, depending on its features and intended use, which will vary as needed or desired. Of particular interest, the receiver circuit 14 includes an impairment correlation estimation circuit 20 that is configured to determine received signal impairment correlations with a high degree of computational efficiency.

Figure 2:
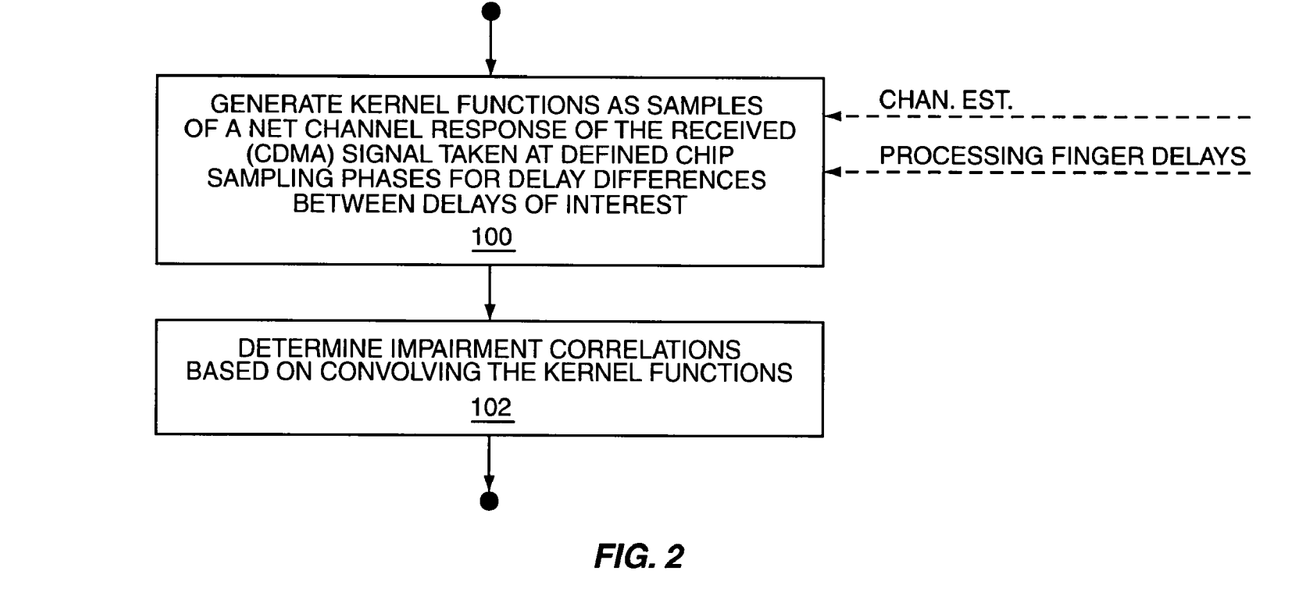
FIG. 2 is a logic flow diagram of one embodiment of processing logic for generating kernel functions from a received signal net channel response, and convolving those functions to obtain impairment correlation estimates for delays of interest.

For example, FIG. 2 illustrates one embodiment of impairment correlation estimation processing. According to the illustrated processing logic, the impairment correlation estimation circuit 20 determines impairment correlations between a plurality of delays of interest for a received CDMA signal by generating kernel functions as samples of a net channel response of the received CDMA signal. Here, "between" a plurality of delays connotes the delay differences for respective pairs of the delays of interest. More particularly, the kernel functions are based on samples of the net channel response taken at defined chip sampling phases for delay differences between a plurality of delays of interest (Step 100). Impairment correlation estimation processing continues with determining the impairment correlations based on convolving the kernel functions (Step 102). In parametric Generalized Rake (G-Rake) implementations of the receiver circuit 14, the delays of interest are the delays associated with G-Rake processing delays, which provide for interference suppression.

Impairment correlations may be used for combining weight generation, filter weight generation, signal quality determination, etc. Thus, those skilled in the art will recognize that the base station 10 may also include an embodiment of the impairment correlation estimation circuit, for estimating UL signal impairment correlations, and that the focus on receiver processing at the wireless communication device 12 is for ease of discussion. In general, the methods and apparatuses taught herein teach the estimation of received signal impairment correlations based on processing samples of the net channel response of a received signal Such processing is applicable to uplink and downlink communications, and is applicable to a broad range of CDMA communication signal types and system types.

With that in mind, and by way of non-limiting examples, the base station 10 may comprise part of a wireless communication network, such as a cellular communication network configured to operate according to Wideband Code Division Multiple Access (WCDMA) standards, or according to IS-2000 standards. As such, the wireless communication device 12 may comprise a cellular radiotelephone configured for WCDMA operation, IS-2000 operation, or operation according to another standard. In general, the wireless communication device 12 may comprise any type of wireless communication terminal or circuit, such as a mobile station, pager, PDA, laptop/palmtop computer, or network card therein.

In one or more embodiments of the wireless communication device 12, the receiver circuit 14 comprises a parametric G-Rake receiver circuit, which itself may comprise one or more processing circuits configured for parametric G-Rake operation. The processing circuit(s) used to implement the parametric G-Rake receiver functionality may comprise hardware, software, or any combination thereof. In one or more embodiments, at least a portion of the parametric G-Rake receiver circuit is implemented in a baseband processor, which may comprise one or more microprocessors, digital signal processors, ASICs, FPGAs, or other digital processing circuit, configured according to program instructions comprising one or more computer programs or functions.

Figure 3:
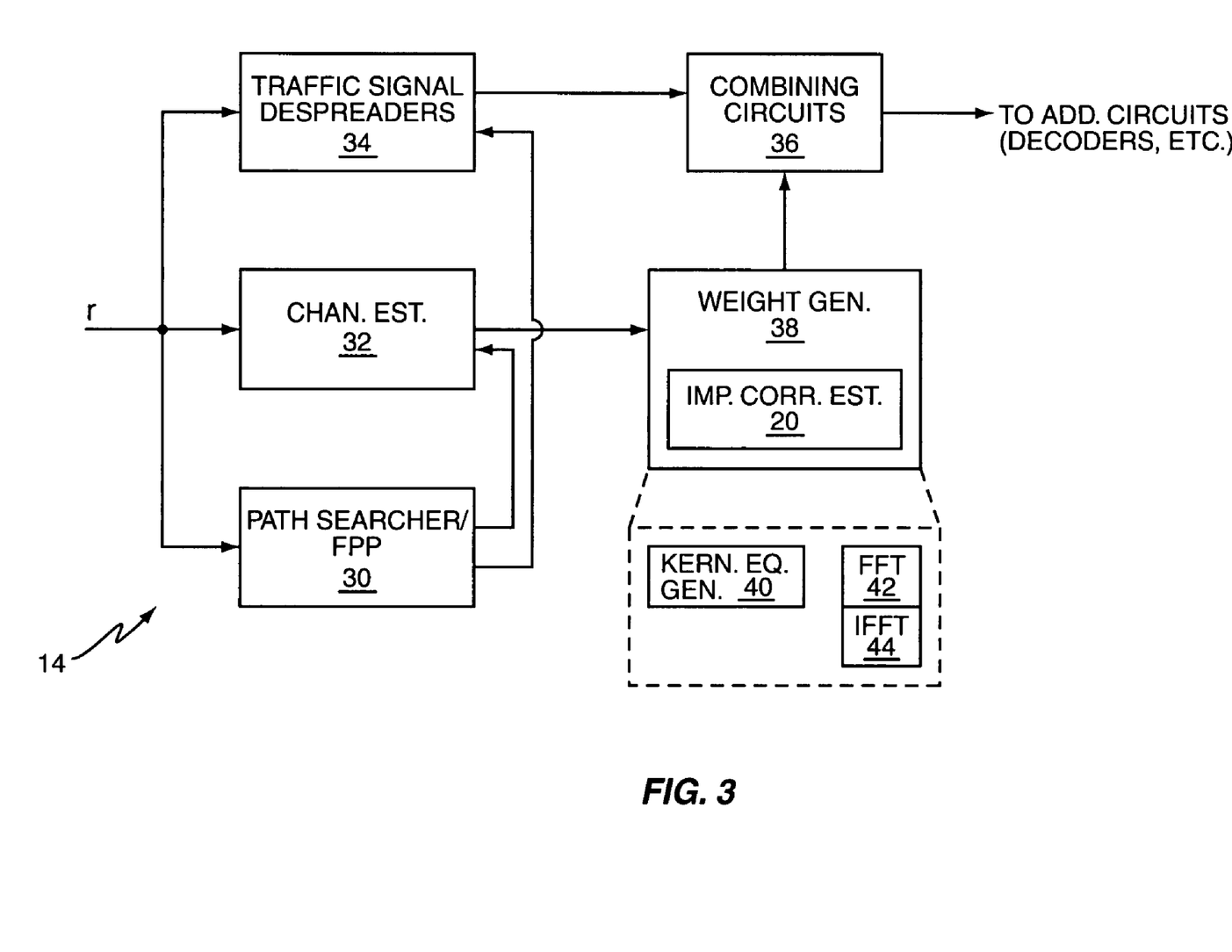
FIG. 3 is a block diagram of one embodiment of a receiver circuit configured for parametric G-Rake receiver operation.

With these hardware/software variations in mind, the parametric G-Rake receiver embodiment of FIG. 3 comprises a path searcher/finger placement processor (FPP) 30, a channel estimation circuit 32, traffic signal despreaders 34, combining circuits 36, and a combining weight generation circuit 38, which includes an embodiment of the earlier-illustrated impairment correlation estimation circuit 20. The illustrated embodiment of the impairment correlation estimation circuit 20 comprises a kernel equation generation circuit 40 configured to form the desired kernel functions, and one or more calculation circuits, e.g., Fast Fourier Transform (FFT) circuits 42 and Inverse FFT (IFFT) circuits 44, configured to process the kernel functions to obtain the impairment correlation estimates. In one or more embodiments, such processing involves convolution, which is performed very efficiently in the frequency domain via FFT processing.

In one embodiment of receiver operation, the receiver circuit 14 obtains digital baseband samples, r, of a received CDMA signal. The path searcher/FPP circuit 30 performs rough correlation processing of the received baseband signal and generates a Power Delay Profile (PDP), or other information identifying the relative delays of the dominant multipath components of the received signal. In turn, the FPP components of the path searcher/FPP circuit 30 determines Rake finger placements, i.e., determines the delay time alignments for received signal despreading, and for interference characterization via one or more fingers. The resolution of the finger placement grid used for finger placement may be understood as defining the "sub-chip" over-sampling rate of the received signal. For example, the finger placement grid may have a time resolution of ¼ of the received signal's "chip" time.

Finger placement information drives operation of the channel estimation circuit 32, which, for purposes of this discussion, may be considered to include measurement or probing fingers that despread pilot symbols. More particularly, in at least one embodiment, the channel estimation circuit 32 places measurement fingers on path delays so that channel estimation may be performed for the propagation paths corresponding to those delays.

Further, the traffic signal despreaders are aligned with the processing delays of interest. For example, each traffic signal despreader in a given set is assigned a channelization code of interest and time-aligned with the respective processing delay of interest. A given set of traffic despreaders is assigned and aligned for each channelization code of interest. In turn, for each channelization code of interest, the combining circuits 36 combine the despread values from the fingers assigned to that code, according to combining weights generated by the combining weight generator circuit 38 in consideration of the received signal impairment correlations, such that the combining weights suppress same-cell and other-cell interference in the traffic despread values being combined.

As noted in Eq. (2) in the Background section of this document, received signal impairment correlations can be represented in parametric form using one or more impairment correlation matrices, or, equivalently, one or more impairment covariance matrices given as, $$R_u = E_c R_l + N_0 R_n + \sum_{j=1}^{J} E_c^j R_O^j = N_0 R_n + \sum_{j=0}^{J} E_c^j R_O^j - hh^H \qquad \text{Eq. (6)}$$

Given the representation of impairment correlation terms in Eq. (6), the other-cell impairment correlation term can be represented as, $$R_O(d_1, d_2) = \sum_{m=-\infty}^{\infty} \left( \sum_{\ell=0}^{L-1} g_\ell R_p(d_1 - mT_c - \tau_\ell) \right) \left( \sum_{q=0}^{L-1} g_q R_p(d_2 - mT_c - \tau_q) \right)^* \qquad \text{Eq. (7)}$$

and, with subtraction of the benign interference term $h(d_1)h(d_2)^*$, the same-cell impairment correlation term can be represented as, $$R_I(d_1, d_2) = \sum_{m=-\infty}^{\infty} \left( \sum_{\ell=0}^{L-1} g_\ell R_p(d_1 - mT_c - \tau_\ell) \right) \left( \sum_{q=0}^{L-1} g_q R_p(d_2 - mT_c - \tau_q) \right)^* - h(d_1)h(d_2)^* \qquad \text{Eq. (8)}$$

Ignoring the benign interference term in Eq. (8), and looking only at the first term—i.e., the summation product term, one sees that $R_I(d_1,d_2)$ is a function of the difference between finger delays, e.g., the difference between $d_1$ and $d_2$, rather than the actual values of the finger delays. (Note that there is a dependence on the chip sample phase of $d_1$ and $d_2$ that must be considered.) Further, one sees that the first term in Eq. (8) can be reformulated as the convolution of two quantities at a particular lag or delay of interest.

From these observations, it is recognized herein that it is possible to use a single convolution to compute all the values of the impairment correlation functions represented in Eq. (7) or Eq. (8). Further, it is recognized herein that convolution may be carried out very efficiently in the frequency domain using FFT processing. Thus, the impairment correlation estimation circuit 20 is configured according to these recognitions, such that it efficiently estimates received signal impairment correlations using convolution processing, preferably carried out in the frequency domain via FFT processing.

For example, for a given number of finger delays of interest, the impairment correlation function $R_I(d_1,d_2)$ can be written as a function of the finger delay differences and the defined chip sampling phases, which, as noted, represent an over-sampling condition for the received signal corresponding to the sub-chip resolution of the finger placement grid. That is, the chip sampling phases of interest correspond to the finger placement positions of the fingers on the finger placement grid. With such a function, $R_I(d_1,d_2)$ can be computed using short linear convolutions of the kernel functions formed as described above. Finally, the impairment correlation estimations can be obtained by performing one or more linear convolutions of the kernel functions. Of course, such processing can be used for $R_O(d_1,d_2)$ as well.

Thus, to compute the impairment correlation between two fingers respectively placed at delays $d_1$ and $d_2$, one may rewrite the first term of Eq. (8) expressly as a function of the delay difference and the sample phase as, $$R_I(k, \Delta) = \sum_{m=-\infty}^{\infty} \left( \sum_{\ell=0}^{L-1} g_\ell R_p(k - mT_c - \tau_\ell) \right) \qquad \text{Eq. (9)}$$

$$\left( \sum_{q=0}^{L-1} g_q R_p((k + \Delta) - mT_c - \tau_q) \right)^*$$

where, $\Delta = d_2 - d_1$ and $k = d_1 - \lfloor d_1/M \rfloor \times M$ (M is the over-sampling rate, and $\lfloor x \rfloor$ denotes the integer portion of x). Eq. (9) makes explicit the dependence of $R_I$ on the sample phase k and the delay difference $\Delta$. With that, the impairment correlation estimation circuit 20 is configured to gain significant computation efficiency by expressing kernel functions z as, $$z(k, \Delta, m) = \sum_{\ell=0}^{L-1} g_\ell R_p((k + \Delta) - mT_c - \tau_\ell) \qquad \text{Eq. (10)}$$

$$m = -\infty, \ldots, \infty$$

such that Eq. (9) becomes $$R_I(k, \Delta) = \sum_{m=-\infty}^{\infty} z(k, 0, m) z^*(k, \Delta, m) \qquad \text{Eq. (11)}$$

Figure 4:
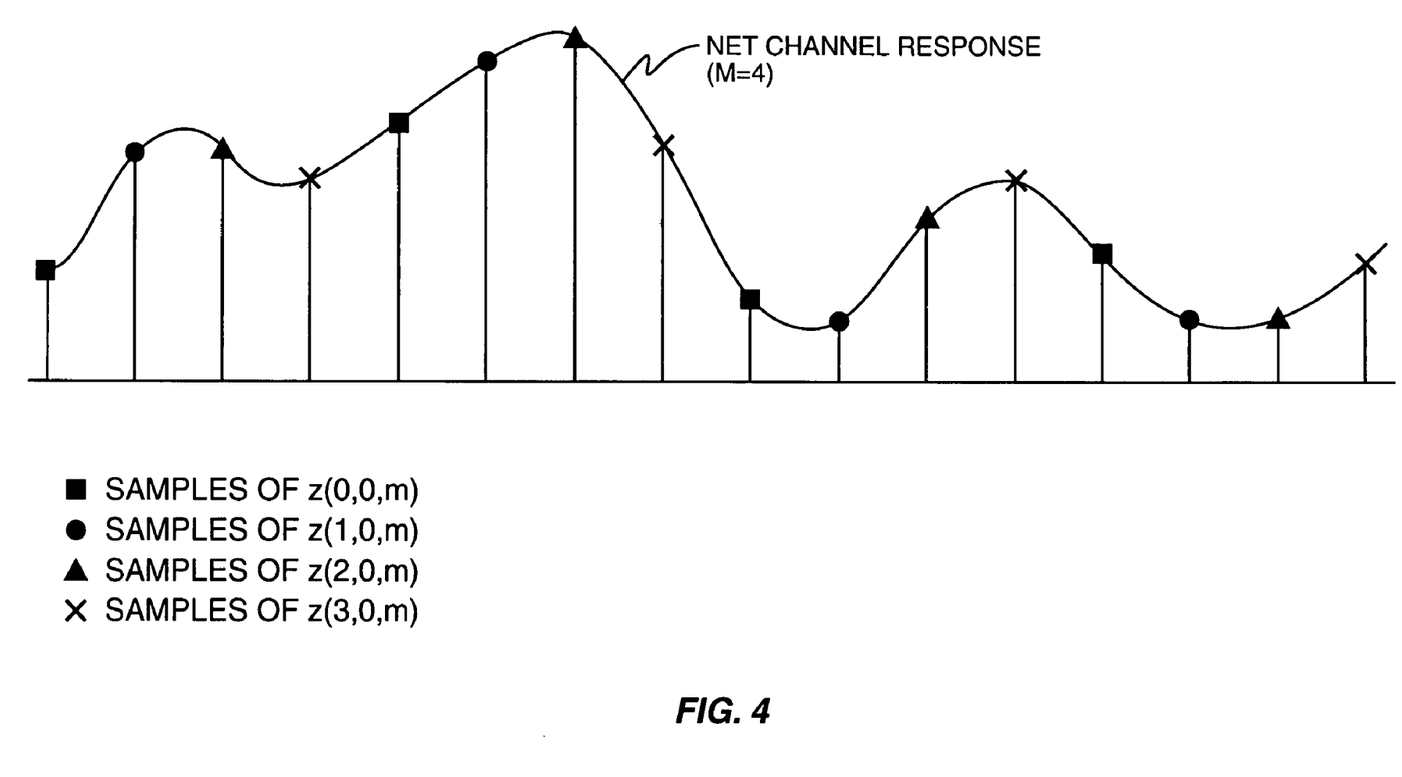
FIG. 4 is a graph of a hypothetical net channel response taken over a given time interval, for kernel functions obtained from four chip sampling phases.

Note the property that $z(k,\Delta,m) = z(p,0,m-q)$, where $q = \lfloor (k+\Delta)/M \rfloor$ and $p = k + \Delta - qM$. Given that p is bounded by 0 and M−1, this property leads to the useful result exploited herein that all that is needed to compute any value of $R_I$ are the M kernel functions $z(k,0,m)$, for M sub-chip sampling phases indexed by $k = 0, \ldots, M-1$. FIG. 4 illustrates the kernel function z for four different sampling phases, corresponding to an over-sampling rate of M=4.

From the illustration of FIG. 4, one sees that the kernel function z represents samples of the net channel response taken at defined sampling phases. Those skilled in the art will appreciate that the net channel response may be determined as a convolution of the transmitter pulse-shaping filter response, the propagation medium response, and the receiver pulse-shaping filter response. Where the transmit and receive filter responses are matched, one may compute an autocorrelation of the transmit or receive filter response.

Figure 5A:
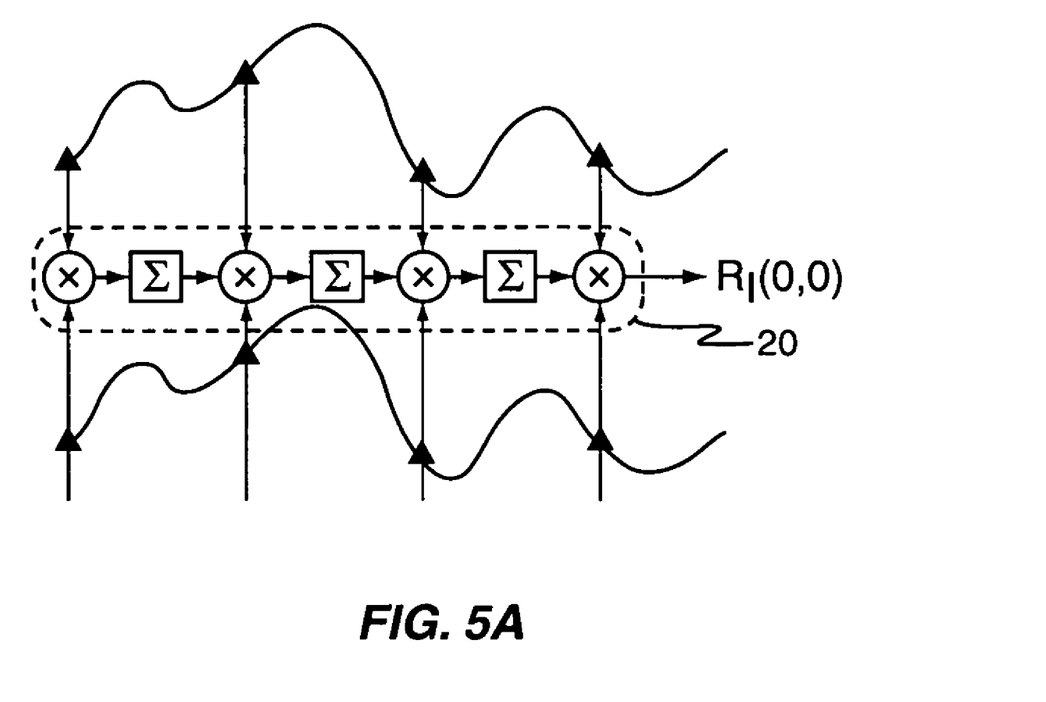
FIGS. 5A and 5B are graphs illustrating the multiplication and summing operations corresponding to kernel function convolution.
Figure 5B:
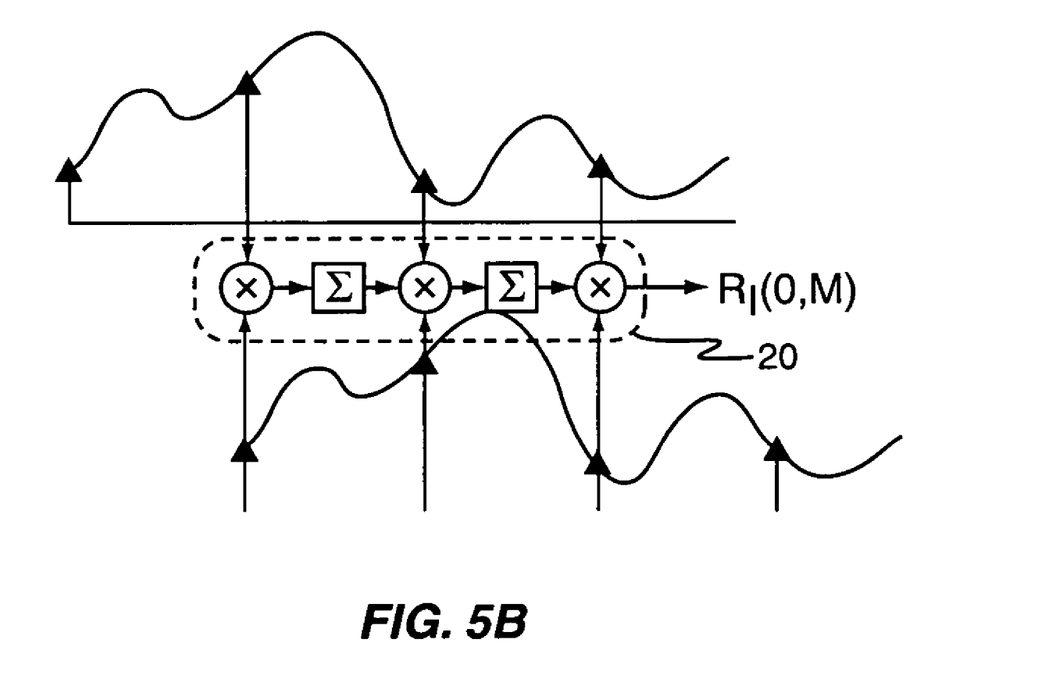

In any case, it is recognized herein that correlation simply is linear convolution with one function time-reversed. Given this insight, it is further recognized herein that one may compute the impairment correlations for all probing finger delays of interest by performing a convolution of the kernel functions taken over a defined time window, which may be set as a function of the maximum delay spread between the fingers. Of course, the delay combinations for which the convolutions are valid depend upon the kernel functions involved. For example, $$z(0,0,m) \otimes z^*(0,0,-m) \qquad \text{Eq. (12)}$$

gives correlation function values for $k=0$ and $\Delta=nT_c$ (n is an integer, $\otimes$ denotes linear convolution). Convolving each kernel function with time-reversed copies of itself and the other M−1 kernel functions gives the correlation function for all sample phases and all delays. FIGS. 5A and 5B partially illustrate the convolution approach, by depicting the multiplication and summing involved in convolving kernel functions.

In better understanding kernel function properties and advantages, it may help to recognize that the kernel functions represent the net channel response on a sub-chip spaced raster, such as shown in FIG. 4. The impairment correlation estimation circuit 20 may be configured to compute $R_I(k,\Delta)$ for a particular sample phase k and delay differences $\Delta$ that are a multiple of M. Starting with k=0, one has, $$R_I(0, 0) = \sum_{m=-\infty}^{\infty} z(0, 0, m)z^*(0, 0, m) \qquad \text{Eq. (13)}$$

$$R_I(0, M) = \sum_{m=-\infty}^{\infty} z(0, 0, m)z^*(0, M, m) = \sum_{m=-\infty}^{\infty} z(0, 0, m)z^*(0, 0, m-1)$$

$$R_I(0, 2M) = \sum_{m=-\infty}^{\infty} z(0, 0, m)z^*(0, 2M, m) = \sum_{m=-\infty}^{\infty} z(0, 0, m)z^*(0, 0, m-2)$$

$$\vdots$$

The above expressions exploit the previously noted fact that $z(k,\Delta,m)=z(p,0,m-q)$, where $q=\lfloor(k+\Delta)/M\rfloor$ and $p=k+\Delta-qM$. Thus, values of $R_I(0,\Delta)$ for $\Delta=iM$ yield expressions in terms of the summation of a kernel function multiplied by a shifted version of itself. By writing out enough expressions for $\Delta=iM$, it becomes clear that successive values of $R_I(0,iM)$ are obtained by sliding $z^*(0,0,m)$ past a conjugated version of itself. Thus, $$R_I(0,iM)=z(0,0,m)\otimes z^*(0,0,-m) i=-\infty,\ldots,\infty \qquad \text{Eq. (14)}$$

where $\otimes$ denotes convolution, and where it should be understood that time reversal is necessary for convolution to accurately represent correlation. Similarly, $$R_I(1,iM)=z(1,0,m)\otimes z^*(1,0,-m)$$

$$R_I(2,iM)=z(2,0,m)\otimes z^*(2,0,-m)=-\infty,\ldots,\infty$$

$$R_I(3,iM)=z(3,0,m)\otimes z^*(3,0,-m) \qquad \text{Eq. (15)}$$

While Eq. (12)-Eq. (15) illustrate the determination of the chip spaced delays of $R_I(k,\Delta)$ from the kernel functions, the impairment correlation estimation circuit 20 can be configured to obtain the sub-chip delays of $R_I(k,\Delta)$ by convolving kernel functions of different sampling phases by following the operations immediately outlined above. The final result is that $M^2$ convolutions give all the samples of $R_I(k,\Delta)$, where $M^2$ convolutions means that each kernel function is convolved with the conjugated version of all the kernel functions.

Note that performing these repeated convolutions essentially involves duplication of some convolutions. Thus, in one or more embodiments, the impairment correlation estimation circuit 20 includes logic to prevent duplicative convolution processing, thereby requiring only $(M^2+M)/2$ unique convolutions.

Figure 6:
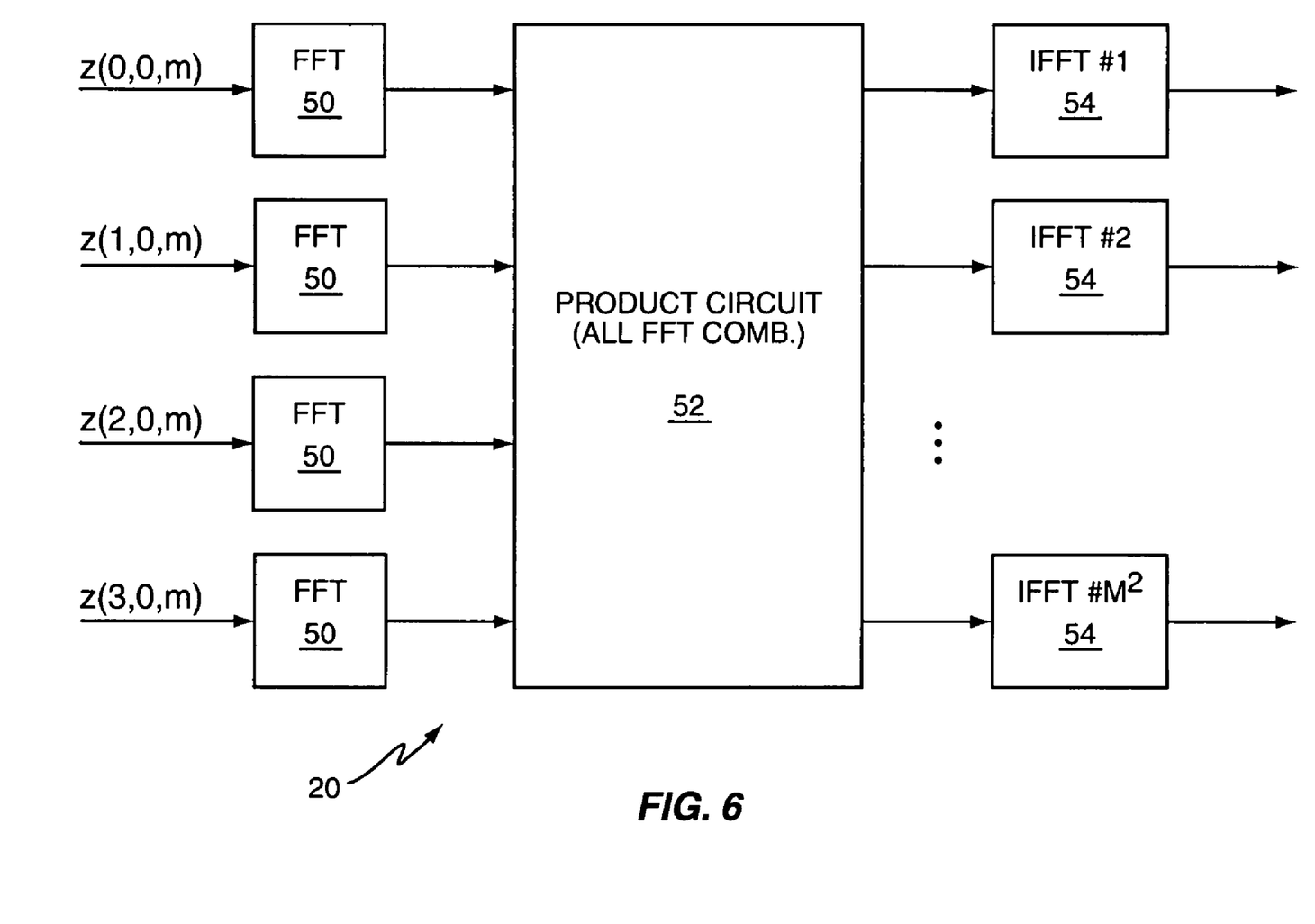
FIG. 6 is a block diagram of one embodiment of an impairment correlation estimation circuit.

Irrespective of whether that convolutional efficiency improvement is implemented, the impairment correlation estimation circuit 20 can be configured to carry out kernel function processing in the frequency domain for significant gains in computational efficiency. For example, FIG. 6 illustrates a configuration of the impairment correlation estimation circuit 20 configured for frequency domain processing of the kernel functions. The illustrated circuit embodiment includes a number of FFT circuits 50, a product circuit 52, and a number of IFFT circuits 54. For an over-sampling factor of M, yielding k=0, . . . , M−1 sampling phases for the kernel functions z, there are, in one embodiment, M FFT circuits 50, and $M^2$ IFFT circuits 54. The IFFT circuits 54 process the products formed by the product circuit 52, which comprise products of all combinations of the M FFTs, to obtain time-domain impairment correlation estimates for populating the $R_I$ and/or $R_O$ matrix elements.

Figure 7:
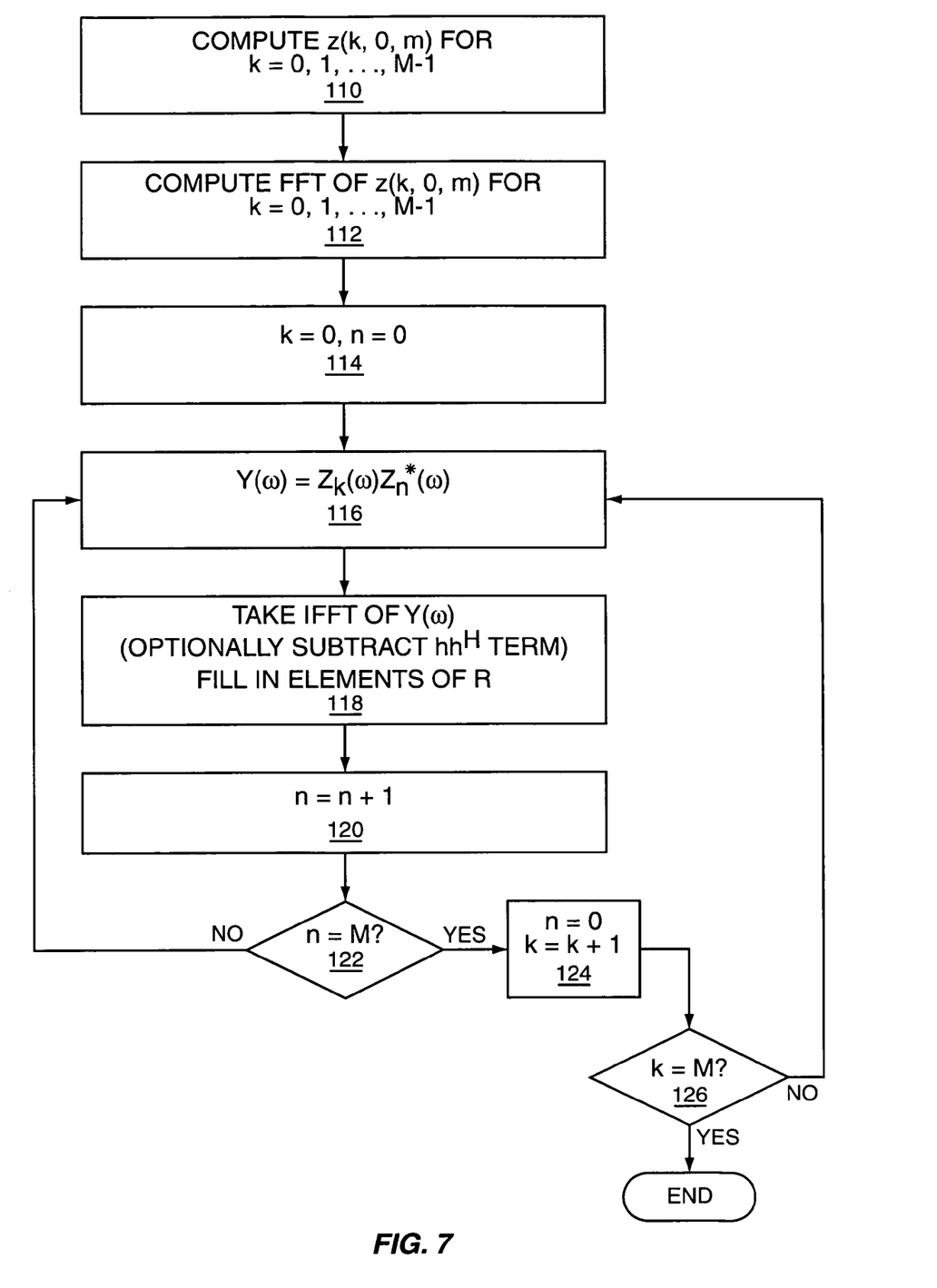
FIG. 7 is a logic flow diagram illustrating one embodiment of impairment correlation estimation based on the functional circuit arrangement of FIG. 6.

FIG. 7 illustrates one embodiment of processing logic that may be implemented in hardware and/or software by the impairment correlation estimation circuit 20 with regard to the functional circuit arrangement depicted in FIG. 6. Processing begins with the computation of z(k,0,m) for k=0, . . . , M−1 and −N/2≦m≦N/2 (Step 110). In one embodiment N=32, but this parameter can be adjusted as needed or desired, depending on chip/sub-chip spacing and the maximum expected delay spread.

Processing continues with computing the FFT of $z(k,0,m)=Z_k(\omega)$ for k=0, . . . , M−1 (Step 112). Then, letting the indices k=0, n=0 (Step 114), processing continues with computing $Y(\omega)=Z_k(\omega)Z_n^*(\omega)$ (Step 116), and computing the IFFT of $Y(\omega)$ (Step 118). Note that the benign interference term $h(d_1)h(d_2)^*$ is subtracted for computation of entry $R_I(d_1, d_2)$ in the same-cell impairment correlation matrix $R_I$. Processing continues with incrementing n=n+1 (Step 120) and checking if n=M (Step 122). If n<M, processing returns to Step 116 for computation of the next value of $Y(\omega)$. Otherwise, processing continues with setting n=0, k=k+1 (Step 124), and determining whether k=M ? (Step 126). If so, the various combinations of convolutions corresponding to the different sample phases are complete for the delays of interest and processing ends with respect to those delays, at least for the current calculation interval. If not, processing returns to Step 116.

Figure 8A:
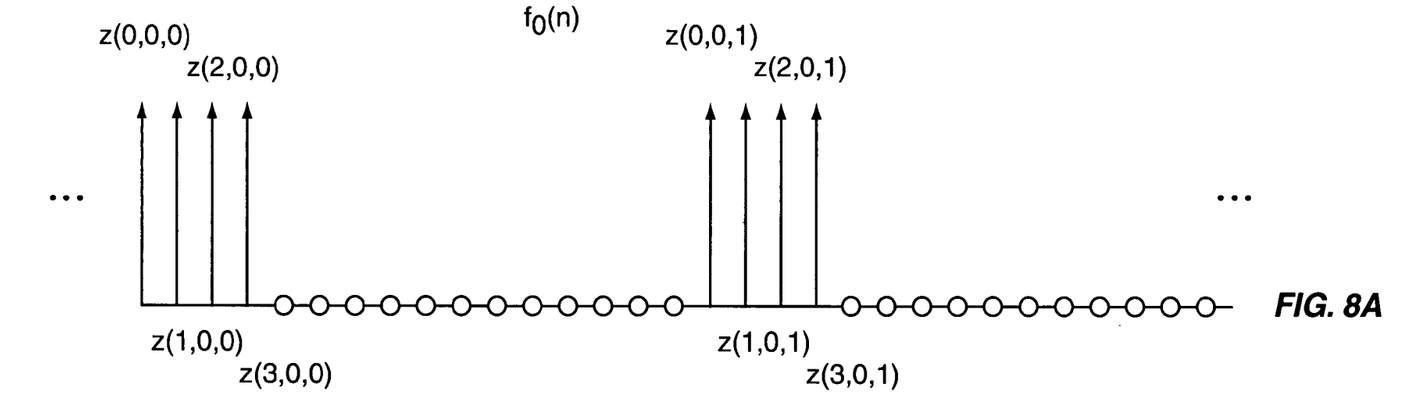
FIGS. 8A and 8B are graphs of one embodiment of interleaved kernel functions, which may be used for efficient frequency domain processing of kernel functions.
Figure 8B:
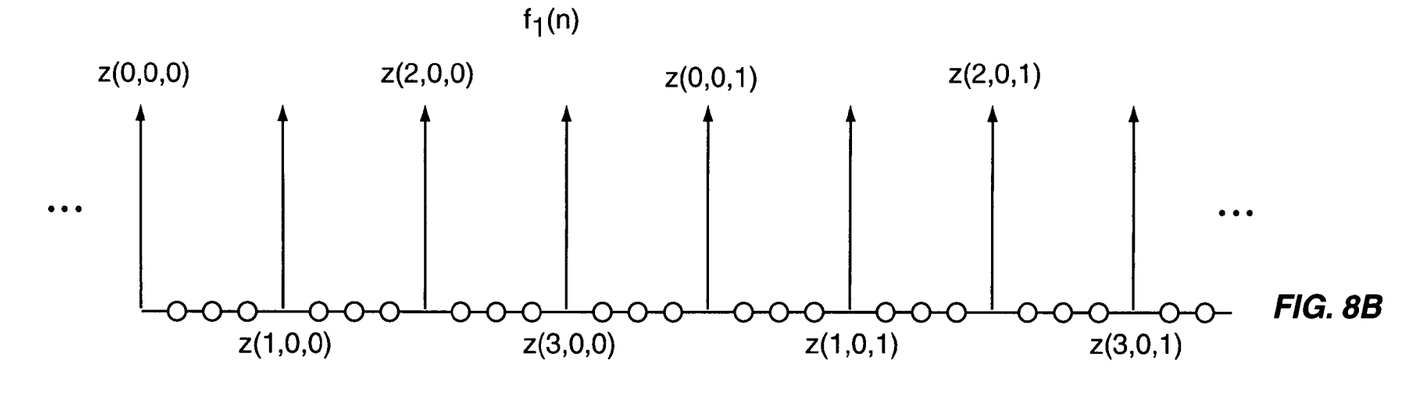

Another embodiment of the impairment correlation estimation circuit 20 exploits the ability to carry out multiple convolutions in parallel, based on a proper interleaving of the kernel functions. Specifically, the impairment correlation estimation circuit 20 can be configured to manipulate the kernel functions into two new functions, $f_0(n)$ and $f_1(n)$, that represent different interleaving patterns of the kernel functions. FIGS. 8A and 8B respectively illustrate $f_0(n)$ and $f_1(n)$ for M=4, wherein it may be seen that $f_0(n)$ is given by $$f_0(iM^2) = z(0, 0, i) \qquad \text{Eq. (16)}$$
$$f_0(iM^2 + 1) = z(1, 0, i)$$
$$\vdots \qquad i = -\infty, \ldots, \infty$$
$$f_0(iM^2 + M - 1) = z(M-1, 0, i)$$

and the function $f_1(n)$ is given by $$f_1(iM^2) = z^*(0, 0, i) \qquad \text{Eq. (17)}$$
$$f_1(iM^2 + M) = z^*(1, 0, i)$$
$$\vdots \qquad i = -\infty, \ldots, \infty$$
$$f_1(iM^2 + (M-1)M) = z^*(M-1, 0, i)$$

The unfilled circles distributed along the horizontal axis between non-zero values of the kernel functions indicate zero values.

Multiplying the corresponding values of $f_0(n)$ and $f_1(n)$ as depicted in FIGS. 8A and 8B and summing the products would result in $R_I(0,0)$. If $f_1(n)$ is shifted one sample right, then multiplication and summation carried out by the impairment correlation estimation circuit 20 yields $R_f(0,1)$. Thus, all impairment correlation estimates may be obtained by carrying out the multiplication and summation for all shifted versions of $f_1(n)$, meaning that the impairment correlation estimation circuit 20 can be configured to obtain all desired impairment correlation estimates $R_f(k,\Delta)$ by convolving $f_0(n)$ and $f_1(n)$.

Again, because convolution can be carried out in either the time or frequency domains, efficiency improvements may be obtained by configuring the impairment correlation estimation circuit 20 to perform the interleaved function convolution via FFT/IFFT processing. Doing so reduces such processing to two FFTs and one IFFT. While not necessary in some applications, it generally should be understood that zero padding of the functions $f_0(n)$ and $f_1(n)$ avoids aliasing, and thereby assures linear convolution.

Figure 9:
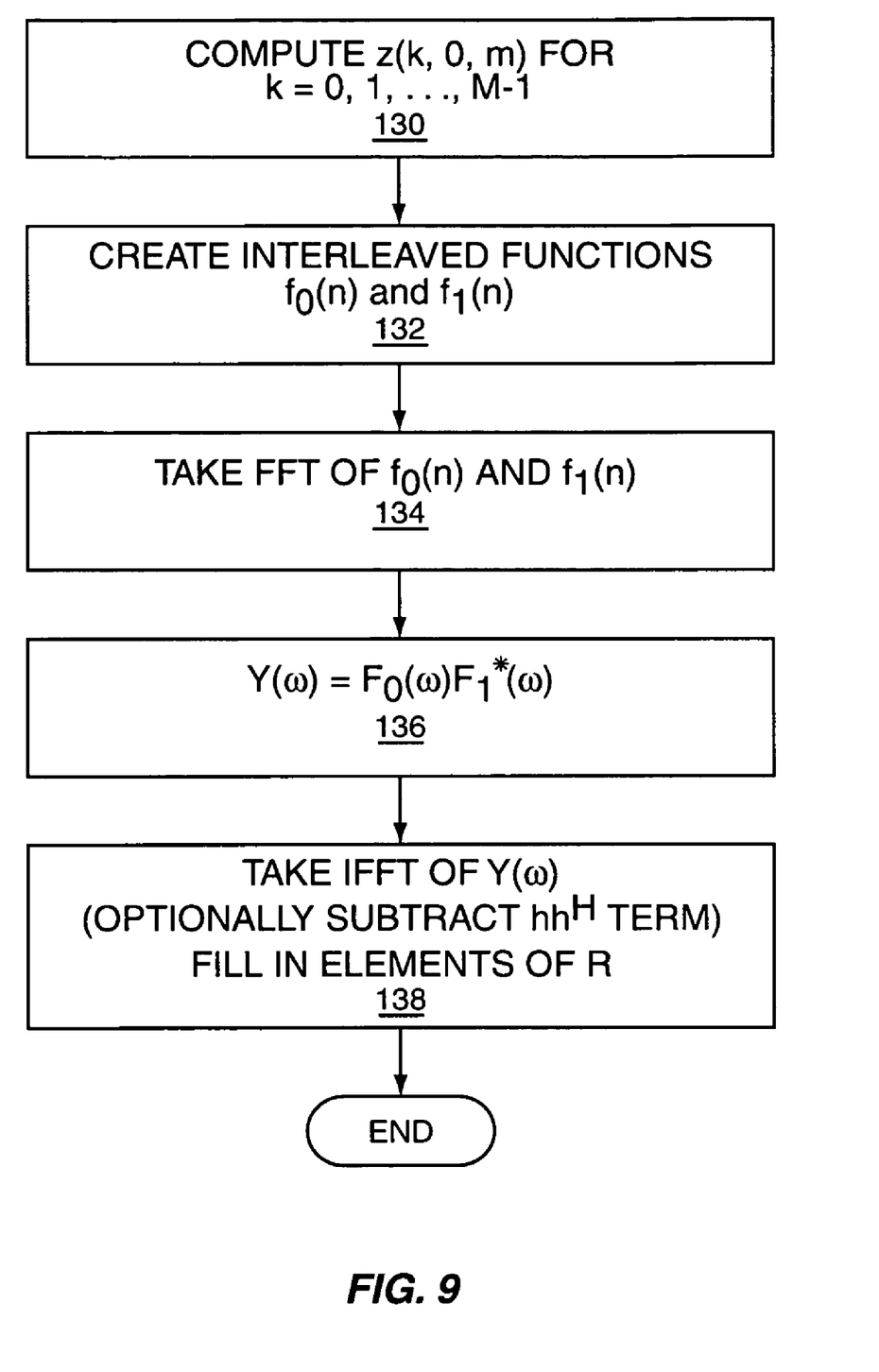
FIG. 9 is a logic flow diagram of one embodiment of processing logic for impairment correlation estimation using the interleaved kernel functions of FIGS. 8A and 8B.

FIG. 9 illustrates processing logic that may be implemented in an embodiment of the impairment correlation estimation circuit 20, for carrying out the above interleaved function operations, wherein processing begins with computing $z(k,0,m)$ for $k=0, \ldots, M-1$ and $-N/2 \leq m \leq N/2$ (Step 130). Processing continues with manipulating the kernel functions to form the interleaved versions of the kernel functions, such as is illustrated in Eq. (16) and Eq. (17) (Step 132).

The impairment correlation estimation circuit 20 then calculates an FFT of size $NM^2$ of both $f_0(n)$ and $f_1(n)$ (Step 134), computes the product of the frequency domain representations $Y(\omega)=F_0(\omega) F_1^*(\omega)$ (Step 136), and performs an IFFT of size $NM^2$ to obtain time-domain impairment correlation estimates, from which it extracts the impairment correlation function values corresponding to all desired combinations of probing finger delays (Step 138). Again, for $R_I$ element calculation, the impairment correlation estimation circuit 20 subtracts the benign interference term $h(d_1)h^*(d_2)$ from the IFFT results. Processing then stops, at least with respect to the current calculation interval.

Thus, the impairment correlation estimation circuit 20 may be configured to perform individual FFTs and IFFTs with respect to the different sample phase combinations of the kernel functions, or, in another embodiment, simplify frequency domain processing by performing relatively simple manipulation of the kernel functions to obtain the above-explained interleaved functions. Other considerations also may come into play.

For example, the above embodiments may be considered as choosing between one approach that computes the correlation function values for a particular sample phase and chip-spaced offsets of a particular lag independently of any other sample phase and lag, and another approach that computes all sample phases and lags jointly. However, the impairment correlation estimation circuit 20 can be configured for intermediate forms of kernel equation processing.

For example, consider computing all lags—probing finger delays—of a particular sample phase jointly. In support of this, $f_0(n)$ and $f_1(n)$ may be redefined as follows:

$$f_0(iM) = z(0, 0, i) \qquad \text{Eq. (18)}$$
$$f_0(iM+1) = z(1, 0, i)$$
$$\vdots \qquad i = -\infty, \ldots, \infty$$
$$f_0(iM+M-1) = z(M-1, 0, i)$$

and $f_1(n)$ is $$f_1(iM) = z^*(k, 0, i) \qquad \text{Eq. (19)}$$
$$f_1(iM+1) = 0$$
$$\vdots \qquad i = -\infty, \ldots, \infty$$
$$f_1(iM+M-1) = 0$$

where (again) k is the sample phase for which it is desired to calculate the correlation function. The procedure given for the other embodiments still holds except that the FFT/IFFT sizes must be NM instead of $NM^2$.

As a further case for consideration, the receiver circuit 14 may be configured with chip-spaced path delays and chip-spaced fingers. For such cases, it is sufficient to compute only $z(k,0,m)$ corresponding to the sampling phase of the channel delays. Computing $z(k,0,m) \otimes z^*(k,0,-m)$ in the time or frequency domain will give all the desired correlation function values.

Additionally, while one or more of the above embodiments present G-Rake receiver circuit details, the methods and apparatus taught herein for efficient determination of impairment correlation estimates may be advantageously applied to other receiver types. By way of non-limiting example, the receiver circuit 14 is, in one or more embodiments, configured as a chip equalizer. In such chip equalizer embodiments, the kernel functions are generated and processed to obtain impairment correlation estimates according to the above teachings. In chip equalizer embodiments, the impairment correlation estimates are used to form combining weights, also known as equalizer coefficients. Thus, in one or more embodiments, the receiver circuit 14 comprises or includes a chip equalizer circuit that is configured to carry out a method of determining impairment correlations between a plurality of delays of interest for a received CDMA signal.

The method comprises generating kernel functions as samples of a net channel response of the received CDMA signal taken at defined chip sampling phases for delay differences between the plurality of delays of interest, and determining impairment correlations based on convolving the kernel functions. Further, the chip equalizer circuit is configured to populate entries in an impairment correlation matrix using the impairment correlations, and to determine the plurality of delays of interest based on chip equalizer tap locations, such that the delay differences correspond to differences between tap delays.

Of course, the present invention is not limited by the foregoing discussion, nor is it limited by the accompanying drawings. Indeed, the present invention is limited only by the following claims, and their legal equivalents.

What is claimed is:

1. A method in a wireless receiver of determining impairment correlations between a plurality of delays of interest for a received CDMA signal, the method comprising:
    generating kernel functions as samples of a net channel response of the received CDMA signal taken at defined chip sampling phases for delay differences between the plurality of delays of interest; and
    determining impairment correlations based on convolving the kernel functions.

2. The method of claim 1, wherein determining impairment correlations based on convolving the kernel functions comprises carrying out kernel function convolutions in the frequency domain using one or more Fast Fourier Transforms (FFTs).

3. The method of claim 2, further comprising configuring a size of the one or more FFTs based on a maximum delay spread associated with the delays of interest.

4. The method of claim 1, wherein determining impairment correlations based on convolving the kernel functions comprises convolving kernel functions of different ones of the defined chip sampling phases to determine sub-chip impairment correlations between respective pairs of the delays of interest.

5. The method of claim 4, wherein convolving kernel functions of different ones of the defined chip sampling phases to determine sub-chip impairment correlations between respective pairs of the delays of interest comprises performing a number of Fast Fourier Transforms (FFTs) corresponding to a series of linear convolutions involving the kernel functions of different sampling phases.

6. The method of claim 4, wherein convolving kernel functions of different ones of the defined chip sampling phases to determine sub-chip impairment correlations between respective pairs of the delays of interest comprises interleaving the kernel functions and performing a Fast Fourier Transform (FFT) of the interleaved kernel functions.

7. The method of claim 1, wherein generating kernel functions as samples of a net channel response of the received CDMA signal taken at defined chip sampling phases for delay differences between the plurality of delays of interest comprises computing a kernel function for each of one or more chip sampling phases, at each of one or more chip-spaced sampling times within a defined time window of the received CDMA signal.

8. The method of claim 7, wherein the defined time window of the received CDMA signal corresponds to a maximum delay spread among the delays of interest for the received CDMA signal.

9. The method of claim 7, wherein determining impairment correlations based on convolving the kernel functions comprises convolving the kernel functions in the frequency domain via Fast Fourier Transforms (FFTs) to obtain frequency-domain convolution results, and generating time-domain impairment correlation values by performing Inverse Fast Fourier Transforms (IFFTs) on the frequency-domain convolution results.

10. The method of claim 1, wherein generating kernel functions as samples of a net channel response of the received CDMA signal taken at defined chip sampling phases for delay differences between the plurality of delays of interest comprises computing a kernel function for each of one or more chip sampling phases, at each of one or more chip-spaced sampling times within a defined time window of the received CDMA signal, and interleaving the kernel functions to obtain interleaved kernel functions.

11. The method of claim 10, wherein determining impairment correlations based on convolving the kernel functions comprises convolving the kernel functions in the frequency domain by performing a Fast Fourier Transform (FFT) on the interleaved kernel functions to obtain frequency-domain convolution results, and generating time-domain impairment correlation values by performing an Inverse Fast Fourier Transform (IFFT) on the frequency-domain convolution results.

12. The method of claim 1, further comprising populating entries in an impairment correlation matrix in a parametric Generalized Rake (G-Rake) receiver using the impairment correlations.

13. The method of claim 12, further comprising determining the plurality of delays of interest based on G-Rake finger locations, such that the delay differences correspond to differences between finger delays.

14. The method of claim 1, further comprising populating entries in an impairment correlation matrix in a chip equalizer using the impairment correlations.

15. The method of claim 14, further comprising determining the plurality of delays of interest based on chip equalizer tap locations, such that the delay differences correspond to differences between tap delays.

16. A receiver circuit for determining impairment correlations between a plurality of delays of interest for a received CDMA signal, the receiver circuit comprising one or more processing circuits configured to:
generate kernel functions as samples of a net channel response of the received CDMA signal taken at defined chip sampling phases for delay differences between the plurality of delays of interest; and
determine impairment correlations based on convolving the kernel functions.

17. The receiver circuit of claim 16, wherein the one or more processing circuits are configured to determine impairment correlations based on convolving the kernel functions by carrying out kernel function convolutions in the frequency domain using one or more Fast Fourier Transforms (FFTs).

18. The receiver circuit of claim 17, wherein a size of the one or more FFTs carried out by the one or more processing circuits is based on a maximum delay spread associated with the delays of interest.

19. The receiver circuit of claim 16, wherein the one or more processing circuits are configured to determine impairment correlations based on convolving the kernel functions by convolving kernel functions of different ones of the defined chip sampling phases to determine sub-chip impairment correlations between respective pairs of the delays of interest.

20. The receiver circuit of claim 19, wherein the one or more processing circuits are configured to convolve kernel functions of different ones of the defined chip sampling phases to determine sub-chip impairment correlations between respective pairs of the delays of interest by performing a number of Fast Fourier Transforms (FFTs) corresponding to a series of linear convolutions involving the kernel functions of different sampling phases.

21. The receiver circuit of claim 19, wherein the one or more processing circuits are configured to convolve kernel functions of different ones of the defined chip sampling phases to determine sub-chip impairment correlations between respective pairs of the delays of interest by interleaving the kernel functions and performing a Fast Fourier Transform (FFT) of the interleaved kernel functions.

22. The receiver circuit of claim 16, wherein the one or more processing circuits are configured to generate kernel functions as samples of a net channel response of the received CDMA signal taken at defined chip sampling phases for delay differences between the plurality of delays of interest by computing a kernel function for each of one or more chip sampling phases, at each of one or more chip-spaced sampling times within a defined time window of the received CDMA signal.

23. The receiver circuit of claim 22, wherein the defined time window of the received CDMA signal corresponds to a maximum delay spread among the delays of interest for the received CDMA signal.

24. The receiver circuit of claim 22, wherein the one or more processing circuits are configured to determine impairment correlations based on convolving the kernel functions by convolving the kernel functions in the frequency domain via Fast Fourier Transforms (FFTs) to obtain frequency-domain convolution results, and generating time-domain impairment correlation values by performing Inverse Fast Fourier Transforms (IFFTs) on the frequency-domain convolution results.

25. The receiver circuit of claim 16, wherein the one or more processing circuits are configured to generate kernel functions as samples of a net channel response of the received CDMA signal taken at defined chip sampling phases for delay differences between the plurality of delays of interest by computing a kernel function for each of one or more chip sampling phases, at each of one or more chip-spaced sampling times within a defined time window of the received CDMA signal, and interleaving the kernel functions to obtain interleaved kernel functions.

26. The receiver circuit of claim 25, wherein the one or more processing circuits are configured to determine impairment correlations based on convolving the kernel functions by convolving the kernel functions in the frequency domain by performing a Fast Fourier Transform (FFT) on the interleaved kernel functions to obtain frequency-domain convolution results, and generating time-domain impairment correlation values by performing an Inverse Fast Fourier Transform (IFFT) on the frequency-domain convolution results.

27. The receiver circuit of claim 16, wherein the receiver circuit comprises a parametric Generalized Rake (G-Rake) circuit configured to populate entries in an impairment correlation matrix using the impairment correlations.

28. The receiver circuit of claim 27, wherein the parametric G-Rake circuit is configured to determine the plurality of delays of interest based on G-Rake finger locations, such that the delay differences correspond to differences between finger delays.

29. The receiver circuit of claim 16, wherein the receiver circuit comprises a chip equalizer circuit configured to populate entries in an impairment correlation matrix using the impairment correlations.

30. The receiver circuit of claim 29, wherein the chip equalizer circuit is configured to determine the plurality of delays of interest based on chip equalizer tap locations, such that the delay differences correspond to differences between tap delays.

31. A wireless communication device comprising the receiver circuit of claim 16.

* * * * *

UNITED STATES PATENT AND TRADEMARK OFFICE
CERTIFICATE OF CORRECTION

PATENT NO. : 7,688,881 B2 Page 1 of 1
APPLICATION NO. : 11/479483
DATED : March 30, 2010
INVENTOR(S) : Cairns et al.

It is certified that error appears in the above-identified patent and that said Letters Patent is hereby corrected as shown below:

On the Title Page, in Field (56), under "FOREIGN PATENT DOCUMENTS", in Column 2, Line 2, insert -- WO     2006/037593    4/2006 --.

Signed and Sealed this

Fifteenth Day of June, 2010

David J. Kappos
*Director of the United States Patent and Trademark Office*